J. SNYDER.
POTATO SEED CUTTER.
APPLICATION FILED JUNE 18, 1908.

924,393.

Patented June 8, 1909.
2 SHEETS—SHEET 1.

Witnesses:

Inventor:
Jerome Snyder

J. SNYDER.
POTATO SEED CUTTER.
APPLICATION FILED JUNE 18, 1908.

924,393.

Patented June 8, 1909.
2 SHEETS—SHEET 2.

Witnesses:—

Inventor:—
Jerome Snyder

UNITED STATES PATENT OFFICE.

JEROME SNYDER, OF BARBERTON, OHIO.

POTATO-SEED CUTTER.

No. 924,393.    Specification of Letters Patent.    Patented June 8, 1909.

Application filed June 18, 1908.  Serial No. 439,223.

*To all whom it may concern:*

Be it known that I, JEROME SNYDER, a citizen of the United States, residing at Barberton, in the county of Summit and State of Ohio, have invented certain new and useful Improvements in Potato-Seed Cutters; and I do declare the following to be a full, clear, and exact description of the invention, such as will enable others skilled in the art to which it appertains to make and use the same.

My invention relates to planters and particularly to potato planters.

The object of the invention is to provide a simple, cheap and efficient machine of this character which will feed the potatoes from the general hopper to the feed chute which controls the number of potatoes passing through to the knives.

A further object of the invention is the provision of means for supporting the potatoes being cut, and for subsequently raking them into the feed chute.

A still further object of the invention is the provision of means for properly covering the potatoes after they have been inserted into the ground.

With these and other objects in view, the invention consists of certain novel features of construction, combination and arrangement of parts, as will be more fully described and particularly pointed out in the appended claims.

Figure 1:
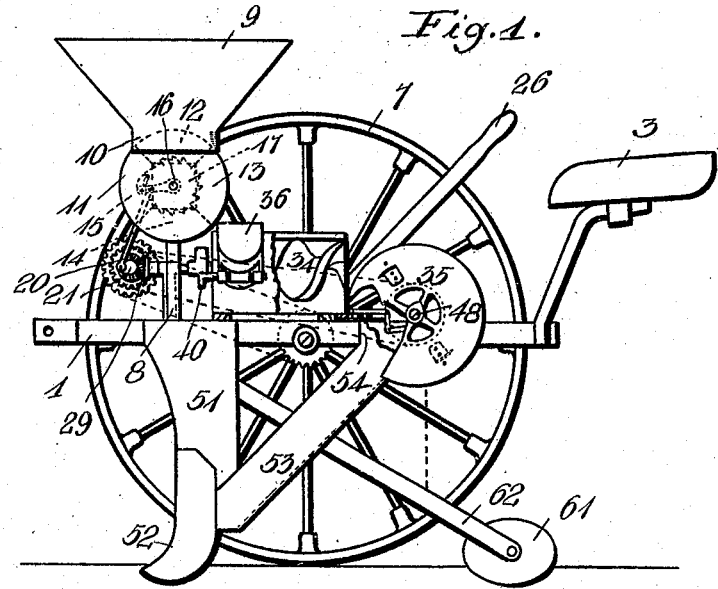
Figure 2:
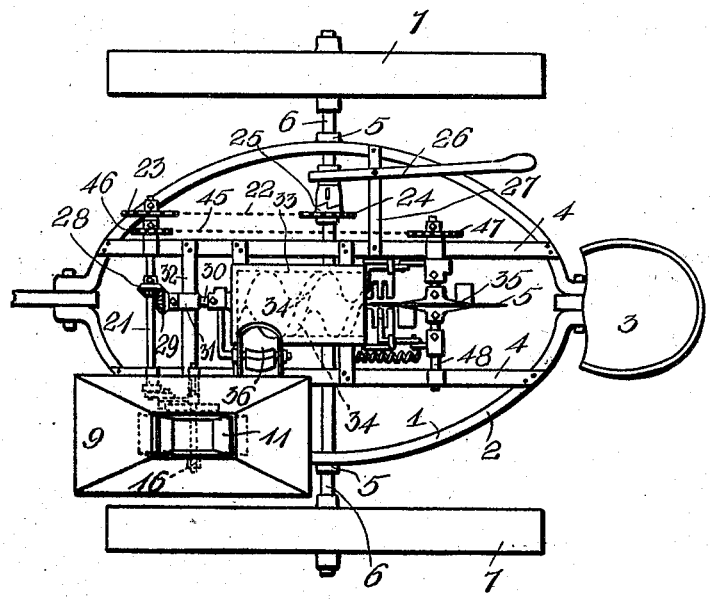

In the drawings, Figure 1 is a side elevation with one wheel removed, Fig. 2 is a top plan view with parts omitted, Fig. 3 is a side elevation partly in section, Fig. 4 is a fragmentary side elevation partly in section, Fig. 5 is a section taken on the line 5—5 of Fig. 3, Fig. 6 is a detail perspective view of one of the cutting knives.

Referring more especially to the drawings, 1 represents a frame, which is preferably composed of an oval-shaped outer rim 2, upon which the usual seat 3 is supported, and a pair of longitudinal girders 4. This frame is supported upon bearings 5, in which a shaft 6 is journaled having at its outer ends the traction wheels 7.

Suitably supported upon bracket arms 8 extending up from the frame 1 is a hopper 9, having a discharge spout or chute 10, closed at its lower end by a feed wheel 11, having preferably four compartments 12, 13, 14 and 15, of equal capacity. This feeding wheel is mounted upon a shaft 16, journaled in the side of the hopper chute 10 and is driven by a ratchet wheel 17, operated by the pawl 18, which is carried upon the crank arm 19, pivoted upon the shaft 16 and controlled through a link 20, by the shaft 21. This latter shaft 21 is journaled in bearings carried upon the longitudinal girders 4 and is driven by a sprocket chain 22, which travels over the wheels 23 and 24, the latter having upon its side face one member of a clutch 25, the opposite being controlled by a lever 26, which is pivoted upon the cross bar 27 carried between the oval rim 2 and one of the longitudinal girders 4. Each revolution of the shaft 21 moves the wheel 11 one-fourth of a revolution, thereby filling and dumping each compartment in successive movements of the wheel. The shaft 21 is also provided intermediate the girders 4 with a beveled pinion 28, which meshes with a similar pinion 29, carried upon the end of the shaft 30, journaled in a bearing 31, upon the cross piece 32. This shaft extends outwardly through the casing 33, in which is mounted the screw conveyer 34, keyed to the shaft and having its delivery end located adjacent the cutting disk 35, to be hereinafter described. The forward end of the casing 33 is opened to delivery from the chute 36, which receives the potatoes from each successively rotated pocket of the wheel 11. While the screw conveyer is adapted to receive only one potato at a time it is deemed advisable to provide some means to prevent crowding of the potatoes to the conveyer so that there will be no friction at this point. In order to do this I slot the chute as at 37, and pivot therein a reciprocating gate 38, having a limiting shield 39. The shaft upon which the gate is pivoted is provided with an extension crank arm 40, which engages the cam 41 carried upon the shaft 30 so as to operate the gate once in each revolution of the shaft 30 thereby allowing one potato per revolution of the screw conveyer. These potatoes are discharged from the conveyer upon an inclined cutting table 42, which comprises a pair of extensions leading out from the V-shaped bottom of the casing 33 so as to form a plurality of divided fingers 44, between which the cutting disk 35 is adapted to rotate, being driven by a sprocket chain 45, which travels over the sprocket wheel 46, on the shaft 21 and the sprocket wheel 47 of the shaft 48, to which the cutting disk 35 is keyed.

In order that the potatoes may be quartered I may detachably secure to the cutting disk in any suitable manner a pair of knives 49, one on either side of the same and in the same arc of the circle defined from the center of the shaft 48. These knives will travel in between the fingers 44 of the table 42 and sever the potato as it comes to rest upon either set of fingers. As one knife only is located upon either side it will be seen from the illustration that the potatoes resting upon the table 42 will only be cut in four pieces, but it will be clearly understood that by attaching additional knives 50, as shown in Fig. 6, one ahead of and the other behind the knives 49 I may further cut the potato. Of course, these knives would be arranged in different circles.

Depending from the longitudinal girders 4 is a plow beam 51 having a feed point 52, on its lower end which is connected with the feed chute 53 which leads to a point immediately beneath the table where it is provided with a funnel end 54, to receive the potatoes as they are discharged from the table 42.

In order to effectively remove the cut potatoes from the tables so as to be ready to receive other potatoes I provide raking arms 55, arranged over each of the set of fingers 44 and mounted to reciprocate in bearings 56, carried by the table 42. These arms have their rear ends connected to bell crank levers 57 which are pivoted to the longitudinal girders 4 and have at their outer ends friction rollers 58, which bear against the cams 59. These cams are keyed to the shaft 48 on either side of the cutting disk 35 and have their major axes arranged at an angle to each other to best suit conditions.

In the operation of the device potatoes are fed from the hopper into the compartments of the rotating wheel, from whence they are dumped into the chute 36, where they are fed one by one to the screw conveyer through the action of the limiting gate 38. Upon being received on the table 42 they are acted upon by the disk 35 and halved. They may be quartered by knives 49 or 50 as above described. The arm 55 is then acted upon by the cams 59, and the potatoes raked into the feed chute 53 from whence they are conveyed to the ground.

Suitable springs 60 are connected to the bell crank lever for returning the arms 57 to normal after being released by the cam, and a suitable disk plow 61 is journaled upon arms 62, depending from the frame to cover the potatoes after being deposited in the ground in the row made by the plow 52.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim and desire to secure by Letters Patent is:—

1. In a potato planter, the combination with a feed conveyer and means for automatically and intermittently feeding potatoes thereto, of a cutting table at the discharge end of said conveyer and having a slot, a cutting device arranged in the slot in said table, and means controlled by the operator for operating said cutting device.

2. In a potato planter, a hopper, a chute arranged adjacent the hopper, a pawl and ratchet device for intermittently feeding the potatoes from the hopper to the chute, an inclosed conveyer, automatic means for controlling the feed from the chute to the conveyer, a cutting table having a slot in line with the conveyer, and a disk cutter arranged to rotate in said slot.

3. In a potato planter, a hopper, a chute arranged adjacent the hopper, a pawl and ratchet device for intermittently feeding the potatoes from the hopper to the chute, an inclosed conveyer, automatic means for controlling the feed from the chute to the conveyer, a cutting table having a slot in line with the conveyer, a rotating disk knife arranged in said slot, and transverse cutting blades upon said knife.

In testimony whereof I have hereunto set my hand in presence of two subscribing witnesses.

JEROME SNYDER.

Witnesses:
ANNA BERNARD,
HARRY S. DAVIDSON.